F. SCHÄTZ & B. VAN DER HOEK.
DEVICE FOR CUTTING COMBS.
APPLICATION FILED FEB. 1, 1908.
942,795.
Patented Dec. 7, 1909.
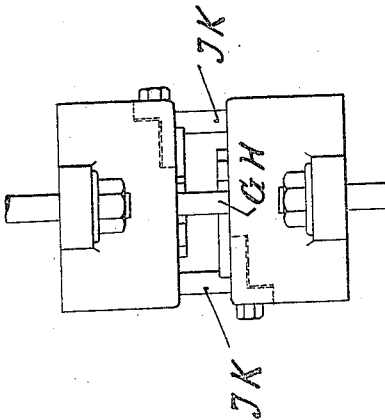
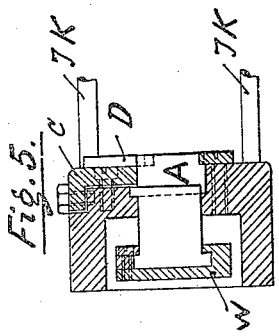
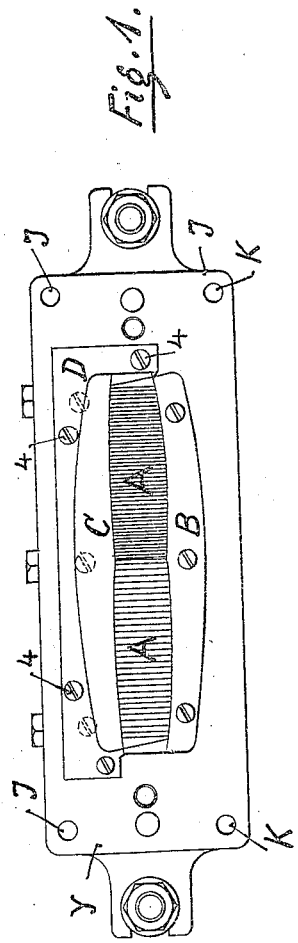
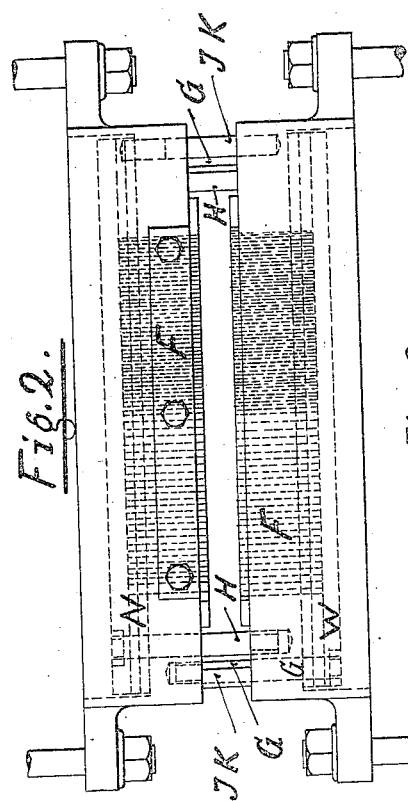
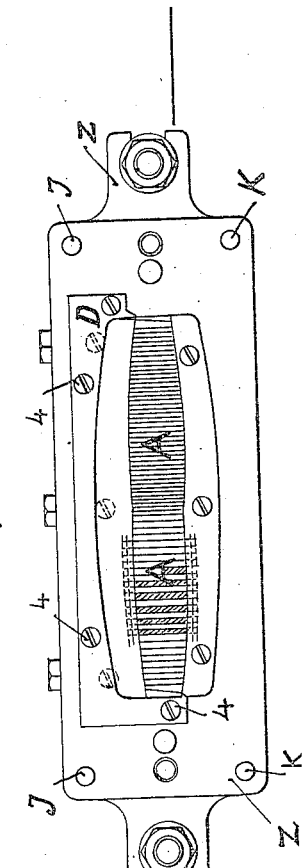

UNITED STATES PATENT OFFICE.

FRANZ SCHÄTZ, OF OBERHAUSEN, NEAR AUGSBURG, GERMANY, AND BERNARD VAN DER HOEK, OF APELDOORN, NETHERLANDS.

DEVICE FOR CUTTING COMBS.

942,795. Specification of Letters Patent. Patented Dec. 7, 1909.

Application filed February 1, 1908. Serial No. 413,913.

*To all whom it may concern:*

Be it known that we, FRANZ SCHÄTZ, a subject of the Emperor of Germany, residing at Oberhausen, near Augsburg, Germany, and BERNARD VAN DER HOEK, a subject of the Queen of the Netherlands, residing at Apeldoorn, Netherlands, have invented certain new and useful Improvements in Devices for Cutting Combs, of which the following is a full, clear, and exact specification.

The present invention relates to the type of devices for stamping out combs of celluloid, hard rubber, horn, or any other suitable material, in which lifters, arranged in the upper and the lower dies, serve to raise the combs from the punches and deliver the finished combs. These lifters acted heretofore on the backs of the combs only, and the teeth of the comb were often injured and torn, when combs with very fine teeth were produced.

The present invention has for its object to arrange lifter-plates also between the teeth and thereby avoid the injury to the latter.

According to this invention the lifters, composed of separate small plates, move between the cutting dies of the lower and the upper punch respectively, in such a manner that the small plates forming the lifters, more or less fill out the spaces between the cutting plates of the dies. The delivery of very fine-toothed combs is thereby considerably facilitated, without their being damaged in the least.

In the drawings accompanying our specification, and forming part thereof, Figure 1 is a plan view of the bottom die, Fig. 2 a front elevation of the whole device, Fig. 3 a plan view of the top-die, Fig. 4 a side elevation of the device, and Fig. 5 a cutting-die with lifters in transverse section.

The device consists in well-known manner of a punch having a bottom die *y* and a top die *z* of corresponding form. They are pressed against each other, when simultaneously two combs are stamped out of a piece of celluloid, hard rubber, horn, or other suitable material. For the stamping out of the teeth of the comb small, sharp-edged, steel plates A, are employed being placed in a row and held together by two bars B and C. These bars B and C are provided with grooves which correspond to the distance desired between the teeth of the combs to be manufactured, and into which fit the small cutting plates A. In addition to the bars B and C, a special bar D, is secured to each die by means of screws 4, to effect the cutting out of the end teeth and of the back of the comb.

In order to separate the two corresponding combs being stamped out of the material at every stroke of the apparatus and to lift them out of the device, two lifter-bars W and N (Figs. 2 and 5) are used. The lifters consist of a number of small plates F, adapted to the shape of the cutting plates and fitted in the lifter bars W and N. The lower lifter-bar W, projecting with its small plates F into the spaces between the cutting-plates A of the bottom-die, is connected with the top-die by means of two bolts G, while the upper lifter-bar N projecting in a like manner into the spaces of the upper cutting-plates is connected to the bottom-die by two bolts H. The screw threaded ends of these bolts are screwed into the dies and the heads are secured in any suitable manner to the lifter bars. In closing the punch the two cutting-dies are brought together and the lifters move away from each other as will be easily understood while in opening the punch, the lifters approach each other, whereby the lifting plates F, advancing between the cutting-plates A, are pressed to the surface of the punch, and thereby the combs stamped and lifted out, lie ready to hand for removal.

Having thus described our invention, we declare that what we claim is:

1. Means for stamping out combs out of celluloid or other suitable material, comprising two dies with cutter plates, a lifter bar fixed in each die, lifter plates secured to the lifter bars in the upper and lower dies, adapted to move between the cutter plates of each die and fill the spaces between them, substantially as described.

2. Means for stamping out combs of celluloid or other suitable material, comprising an upper and lower die, containing each a cutter bar and a lifter bar, the upper cutter bar being rigidly connected to the lower lifter bar and the lower cutter bar connected with the upper lifter bar, substantially as described.

In testimony whereof we affix our signatures.

FRANZ SCHÄTZ.
BERNARD VAN DER HOEK.

In presence of—
A. HECKMANN,
WILHELM FLASCHE.